United States Patent [19]
Makwana et al.

[11] Patent Number: 5,993,514
[45] Date of Patent: Nov. 30, 1999

[54] PROCESS FOR UPGRADING COPPER SULPHIDE RESIDUES CONTAINING NICKEL AND IRON

[75] Inventors: Manher Mohan Makwana, Sherwood Park; Derek George Eagland Kerfoot; John Stiksma, both of St. Albert, all of Canada

[73] Assignee: Dynatec Corporation, Fort Saskatchewan, Canada

[21] Appl. No.: 08/956,116

[22] Filed: Oct. 24, 1997

[51] Int. Cl.[6] ............................. C22B 3/08; C01G 3/12; C01G 49/02
[52] U.S. Cl. .......................... 75/743; 423/37; 423/150.4
[58] Field of Search ................................ 75/743; 423/37, 423/150.4

[56] References Cited

U.S. PATENT DOCUMENTS

| | | |
|---|---|---|
| 3,616,331 | 10/1971 | O'Neill . |
| 3,741,752 | 6/1973 | Evans et al. ..................... 423/150.4 |
| 4,323,541 | 4/1982 | Saarinen et al. . |
| 5,344,479 | 9/1994 | Kerfoot et al. . |
| 5,628,817 | 5/1997 | Fugleberg et al. . |

Primary Examiner—Melvyn Andrews
Assistant Examiner—Tima McGurthry-Banks
Attorney, Agent, or Firm—Arne I. Fors

[57] ABSTRACT

There is disclosed a process for separating and recovering nickel and copper values from a nickel-copper matte which may contain iron and arsenic. Finely divided nickel-copper matte undergoes one or more steps of sulphuric acid leaching at atmospheric pressure to produce a nickel sulphate solution and an iron and/or arsenic containing copper-rich sulphide residue. The copper-rich sulphide residue is repulped in sulphuric acid solution to selectively redissolve most of the iron and arsenic and the iron and arsenic containing solution is separated from the copper-rich residue. The iron and arsenic are largely precipitated from the leach solution in a pressure hydrolysis step and the iron and arsenic containing precipitate is separated and discarded. The iron and arsenic-depleted solution is recombined with the copper-rich sulphide residue from the acid repulp step and the resulting slurry is treated in a non-oxidizing pressure leach in which nickel arsenic and iron are extracted. The process produces a nickel sulphate solution containing low levels of copper, iron and arsenic and a copper sulphide product containing low levels of nickel, iron, arsenic and other impurities.

13 Claims, 8 Drawing Sheets

PROCESS FOR UPGRADING COPPER SULPHIDE RESIDUES CONTAINING NICKEL AND IRON

BACKGROUND OF THE INVENTION (i) Field of the Invention

This invention relates to an improved hydrometallurgical process for treating nickel-copper mattes for the recovery of copper and nickel values. More particularly, the invention involves a process for treating iron and arsenic containing nickel-copper matte to thereby produce an essentially copper-free solution of nickel sulphate, from which metallic nickel can be recovered by processes such as electrowinning, and a copper sulphide concentrate containing low levels of iron, arsenic and nickel, from which copper can be recovered by a variety of conventional processes.

(ii) Description of the Related Art

Copper is recovered from copper sulphide concentrates by a variety of industrial processes including smelting and electrorefining, and roasting, leaching and electrowinning. In all cases it is desirable to ensure that nickel and arsenic, when present in the ore or concentrate, are separated from the copper prior to the electrolytic process step, in which they dissolve and accumulate in the electrolyte, with deleterious effect on cathode product quality and process economics. In the roast-leach-electrowinning process it is also desirable to minimize the level of iron in the copper sulphide concentrate to prevent the formation of acid-insoluble copper ferrites in the roasting step, which can significantly reduce the copper recovery attainable by this process route.

Copper frequently occurs in combination with nickel in sulphide ores, with the most common minerals being chalcopyrite, $CuFeS_2$, and pentlandite, $NiFeS_2$, in which the copper and nickel occur in combination with iron and sulphur. Arsenic is frequently present in low concentrations in nickel-copper sulphide ores. The conventional method for recovering nickel and copper from these ores is by flotation and smelting to produce a nickel-copper matte, typically containing 70 to 94% Ni+Cu, 5 to 22% S, and 0.2 to 5% Fe. Such mattes may also contain up to 5% arsenic, with lesser amounts of antimony and bismuth.

One well established industrial process for the recovery of nickel from nickel-copper mattes utilizes oxidative sulphuric acid leaching at atmospheric pressure to selectively leach nickel to form a relatively pure nickel sulphate solution, which after final purification, forms the feed to a nickel electrowinning process. In this process the copper is recovered as copper sulphide in the leach residue, but this residue also contains substantial amounts of nickel and significant amounts of iron, and in some cases, arsenic. Such a residue typically contains 45 to 55% Cu, 10 to 20% Ni, and up to 5% Fe and As. Before this copper sulphide residue can be processed by the conventional processes to copper metal, the levels of nickel, iron and arsenic must be reduced to less than about 1%.

A number of processes have been proposed to remove nickel, or nickel and arsenic, or nickel and iron from such copper sulphide containing leach residues, but none has yet succeeded in providing a process to remove all three of the metal contaminants. Prior art leach processes illustrative of the art are disclosed in U.S. Pat. No. 5,344,479 granted Sep. 6, 1994 to Sherritt Gordon Limited. PCT published application No. PCT/FI96/00432 filed Aug. 6, 1996, the assignees being Outokumpu Engineering Oy and U.S. Pat. No. 5,628,817 granted May 13, 1997 to Outokumpu Engineering Oy. Also of note, is U.S. Pat. No. 3,616,331 granted Oct. 26, 1971 to the International Nickel Company Inc. and U.S. Pat. No. 4,323,541 granted Apr. 6, 1982 to Outokumpu Engineering Oy.

In U.S. Pat. No. 5,344,479 issued to Kerfoot et al. there is disclosed a process for leaching a finely divided nickel-copper matte in acid solution under oxidizing conditions in an atmospheric leach step to produce a nickel sulphate solution and a copper-rich sulphide residue. The copper-rich sulphide residue is separated from the nickel sulphate solution and pressure leached under a non-oxidizing atmosphere in a sulphuric acid solution to produce a nickel sulphate solution containing iron and arsenic and a low-nickel copper sulphide product essentially free of iron and arsenic. The nickel sulphate solution is then treated in an iron-arsenic precipitation step in which the iron and arsenic are precipitated as ferric arsenate. The ferric arsenate precipitate is separated from the nickel sulphate solution and discarded. The nickel sulphate solution is recycled into the atmospheric leach step.

PCT application No. PCT/FI96/00432 discloses a modified process for recovering nickel and copper and separating iron from two pyrometallurgically produced nickel mattes containing different amounts of iron. The matte containing the lower amount of iron is leached in acid solution under oxidizing conditions at atmospheric pressure to selectively leach nickel from the matte to produce a nickel sulphate solution and a copper-rich sulphide residue. The copper-rich sulphide residue is separated from the nickel sulphate solution and pressure leached under a mildly oxidizing atmosphere in an acid solution to produce a low nickel copper sulphide product. The matte containing the higher amount of iron is treated in the solution from the pressure leach step in a combined oxidative atmospheric leach and iron hydrolysis step in which the solution pH is adjusted to at least 1.0 or higher. The nickel content of the high-iron matte is leached quantitatively, and iron is precipitated as a jarosite or goethite. The low-iron nickel sulphate solution is recycled back into the atmospheric leaching step.

U.S. Pat. No. 5,628,817 discloses a process for leaching nickel and copper from a high-sulphur low-iron nickel-copper matte by means of a multi-stage process. The nickel copper matte is leached in two atmospheric pressure leaching steps in the presence of oxygen using neutral or acidic leaching solutions containing copper sulphate, to produce a nickel sulphate solution and a precipitate of nickel and copper sulphides. The nickel is recovered from the nickel sulphate solution by electrowinning. The nickel and copper sulphide precipitate is then pressure leached in a substantially neutral copper sulphate solution, to produce a solution of nickel sulphate and a copper-rich precipitate. The iron in the nickel sulphate leach solution is then precipitated in an iron removal step and the residue proceeds to an oxidative pressure leach step in which the copper sulphide is quantitatively dissolved. The iron-free nickel sulphate solution from the iron removal step is recycled to the atmospheric leach circuits.

The commonality between these prior art processes resides in the fact that the iron and arsenic removal step is conducted following the non-oxidizing or mildly oxidizing pressure leach.

SUMMARY OF THE INVENTION

It is a principal object of the present invention to provide an improved process for the treatment of nickel-copper mattes to produce an essentially copper-free solution of nickel sulphate, from which metallic nickel can be recovered by processes such as electrowinning or hydrogen reduction, and a copper sulphide concentrate from which copper can be recovered by a variety of conventional processes, including roast-leach-electrowinning or smelting-electrorefining.

More particularly, the objective of the invention is to produce copper sulphide concentrates containing low levels of nickel, iron and arsenic, from copper sulphide-rich leach residues which contain unusually high levels of iron or iron and arsenic.

Furthermore, one seeks to avoid the oxidation of sulphide sulphur to thereby minimize production of by-product sulphate. It is desirable, too, to produce a residue suitable for treatment by roast-leach-electrowinning but which may also be treatable by smelting-electrorefining. To achieve the desired low levels of iron and arsenic in the copper sulphide concentrate product, it is essential to prevent the precipitation of basic ferric sulphates or ferric arsenate in a non-oxidizing pressure leach. It is also sought to maximize nickel recovery concomitant with the production of a purer copper sulphide residue. Significantly, it is preferred to transfer the impurities from the copper sulphide product, by collecting them in an environmentally stable form in the iron residue waste stream.

The improvements in the process derive from the problems which arose when practising the process outlined in the U.S. Pat. No. 5,344,479 patent described supra, the disclosures of which are hereby incorporated by reference. In the original flowsheet (U.S. Pat. No. 5,344,479), it had been believed that in the non-oxidizing pressure leach, the iron and arsenic would be in their lower oxidation states i.e. $Fe^{2+}$ and $As^{3+}$ and therefore would remain in solution during the leach as desired. The discovery upon which the present improved process is derived arose when utilizing the '479 process with mattes having a higher iron concentration of 3 to 5% as opposed to the 0.3% of the matte originally being treated, and with leach residues containing up to 10% arsenic. It was found that insoluble ferric compounds such as ferric arsenate, or sodium jarosite could be formed in the non-oxidizing leach with consequent contamination of the copper sulphide product with iron and arsenic. This would indicate that some oxidation of $Fe^{2+}$ to $Fe^{3+}$ was occurring, under essentially non-oxidizing conditions.

Without being bound by same, it is believed that the iron may be reacting with $Cu^{2+}$ to form $Cu^{+}$ which is known to be more stable at 150° C., than at lower temperatures where it immediately disproportionates to copper powder and $Cu^{2+}$. It is postulated that the reactions may be as follows:

At 150° C.:

$Fe^{2+}+Cu^{2+}\rightarrow Fe^{3+}+Cu^{+}$ $Fe^{3+}+AsO_4^{3-}\rightarrow FeAsO_4$ $Fe_2(SO_4)_3+3H_2O\rightarrow Fe_2O_3+3H_2SO_4$ $Fe_2(SO_4)_3+Na_2SO_4+6H_2O\rightarrow 2NaFe_3(OH)_6(SO_4)_2+6H_2SO_4$ Below 130° C.:

$2Cu^{+}\rightarrow Cu^{0}+Cu^{2+}$

Based on these discoveries, it has been determined that by conducting the iron and arsenic removal step ahead of the non-oxidizing pressure leach, in combination with a copper and iron dissolution step prior to the pressure leach, it is possible to significantly reduce the amount of iron and arsenic entering the non-oxidizing leach and thus minimize potential contamination of the copper sulphide product with said prementioned contaminants.

Broadly stated the invention relates to a process for separating and recovering nickel and copper values from a nickel-copper matte which may contain iron and arsenic which comprises leaching finely divided nickel-copper matte in an aqueous acidic solution under oxidizing conditions at atmospheric pressure with a deficiency of acid and at a minimum temperature of about 80° C. to selectively leach nickel from said matte to produce a nickel sulphate solution having a final pH in the range of about 3.0 to 6.5 and to produce a copper-rich sulphide residue containing a controlled amount of readily acid-soluble copper, separating the copper-rich sulphide residue from the nickel sulphate solution, and leaching said residue in an acid containing solution in a copper and iron dissolution step to provide a copper and iron containing sulphate solution and a copper sulphide residue rich in copper, separating the copper and iron containing sulphate solution from the residue, passing the copper and iron containing sulphate solution to an iron removal stage wherein said solution is reacted at a temperature of up to about 160° C. under pressure in an oxidizing atmosphere to produce an iron-rich residue and a substantially iron-free solution, separating the iron-rich residue and said iron-free solution, and leaching the copper sulphide-rich residue from the copper and iron dissolution step in an acidic solution containing an effective amount of acid-soluble copper under non-oxidizing pressure conditions at a temperature of at least about 130° C. to produce a nickel sulphate solution containing any iron and arsenic and a low nickel, copper sulphide product essentially free of said iron and arsenic. The copper sulphide-rich residue from the copper and iron dissolution step preferably is leached with the iron-free solution produced from the iron removal stage in an acidic solution. The iron removal stage may comprise an iron and arsenic removal stage or an iron, arsenic and antimony removal stage. Iron may be added either as dissolved iron or as acid soluble iron to the iron and arsenic removal stage or to the iron, arsenic and antimony removal stage.

The copper-rich residue from the copper and iron dissolution stage preferably is leached in an acidic solution selected from the group consisting of sulphuric acid, sulphuric acid solution containing nickel sulphate, sulphuric acid solution containing copper sulphate, and sulphuric acid solution containing nickel sulphate and copper sulphate.

Leaching of the finely divided nickel-copper matte preferably is conducted in an aqueous acidic solution sequentially in a first stage atmospheric leach and a second stage atmospheric leach with recycling of the solution from the second stage atmospheric leach to the first stage atmospheric leach.

The solution from the non-oxidizing pressure leach is recycled to said second stage atmospheric leach.

The copper-rich residue from the copper and iron dissolution stage together with the iron-free solution produced from the iron-removal stage may be leached under mildly oxidizing pressure conditions at a temperature of at least about 130° C. to produce a nickel sulphate solution and a low-nickel, copper sulphide product essentially free of said iron and arsenic.

Iron can be precipitated in the iron removal stage as jarosite (25 to 35% Fe) or hematite (50 to 60% Fe), depending on the feed solution sulphuric acid:iron mass ratio, temperature and oxygen pressure.

DESCRIPTION OF THE DRAWINGS

The embodiments of the process of the invention will be better understood having reference to the accompanying drawings, in which:

FIG. 1 shows a schematic flowsheet of the process illustrated in a preferred embodiment of the invention;

FIG. 2 shows a flowsheet of the process of the invention illustrating the inclusion of the roast-leach-electrowinning process for the recovery of cathode copper;

FIG. 3 demonstrates the recovery of nickel powder by hydrogen reduction from the nickel sulphate solution produced by the process of the invention; and FIG. 4 is illustrative of a flowsheet involving partial copper dissolution from the upgraded copper sulphide residue product of the process of the invention, to augment the supply of soluble copper in the process when low copper-:sulphide ratio nickel-copper matte is being treated.

DESCRIPTION OF THE PREFERRED EMBODIMENT

Having reference to accompanying FIG. 1, there is depicted the flowsheet of the basic embodiment of present process. The process comprises a primary stage atmospheric oxidizing leach 12 followed by a secondary stage atmospheric oxidizing leach 14. Matte ground to about 90% passing 44 micrometers is fed to the oxidizing leach 12 for reaction in an aqueous sulphuric acid solution, preferably recycle leach solution from the secondary stage atmospheric oxidizing leach, together with nickel anolyte.

A typical matte composition could consist of, by weight, 30 to 75% Ni, 10 to 45% Cu, up to 10% Fe, 5 to 22% S and up to 5% As. Such impurities as Se, Te, Sb and Bi may also be present. Platinum group metals and precious metals which may also be present include Pt, Pd, Ru, Rh and Au. Typically the Cu:S mass ratio of the matte would be in the range of 1.5:1 to 4:1 and preferably would be in the range of 3:1 to 4:1. The process slurry in the atmospheric leach stage 12 is maintained at a temperature of above about 80° C. Air and/or oxygen is sparged into the process slurry, which is at atmospheric pressure, and the slurry is agitated for extraction of about 40–60% of the nickel with minimum oxidation of the sulphur. An excess of matte is provided relative to the acid to ensure controlled precipitation of the copper as metallic copper, copper sulphide, and basic copper sulphate. The residue may also contain copper oxide ($Cu_2O$) formed by oxidation of metallic copper as well as any unreacted nickel compounds. A final pH in the range of 3.0 to 6.5, preferably about 6.5, is attained to ensure maximum precipitation of the iron, arsenic and other impurities.

The leach solution having up to 90 g/L nickel and less than 10 mg/L of each of copper and iron is passed to cobalt separation and nickel electrowinning (not shown). Nickel anolyte solution, typically containing 50 g/L Ni and 50 g/L $H_2SO_4$ is returned as lixiviant to the leaching circuits.

The nickel-copper sulphide residue is separated from the leach solution in a liquid-solid separator 16 and passed to the secondary stage leach 14 under similar temperature and pressure conditions to those used in the primary stage leach 12 and reacted with a controlled amount of recycled acidic solutions, including nickel anolyte comprised of 50 g/L Ni and 50 g/L $H_2SO_4$, at a sulphuric acid to solids mass ratio in the range of 0.3:1 to 0.6:1, preferably about 0.5:1. The quantity of acid thus is controlled to provide an acid deficiency at the termination of the leach represented by a pH in the range of 4.0 to 6.5, preferably about 4.5, to leach most of the remaining nickel and to produce a leach residue of which about 60% by weight is in a readily acid-soluble form such as basic copper and nickel sulphates and basic iron and iron containing compounds. The acid balance in the circuit is maintained by distributing the nickel anolyte to the appropriate section/s of the circuit as required.

The leach solution containing about 70–80 g/L nickel and 10 g/L Cu at a pH of about 4.5 is recycled to the primary stage atmospheric leach 12. The copper-rich sulphide residue comprised of copper and nickel sulphides and nickel oxide, together with the acid-soluble basic copper sulphate ($CuSO_4 \cdot 2Cu(OH)_2$), basic nickel sulphate and basic iron and arsenic containing compounds, is separated from the leach solution by liquid-solid separator 18 and fed to the copper and iron dissolution stage 20.

In the agitated copper and iron dissolution tank 20, a controlled amount of nickel anolyte containing about 50 g/L $H_2SO_4$ and 50 g/L Ni is added to obtain 20 to 30 g/L $H_2SO_4$ and 5 to 20 g/L Cu in solution. The copper and iron dissolution slurry is fed to a liquid-solid separator 22 to yield a slurry containing about 45 per cent solids which is then transferred to an autoclave feed tank (not shown) and from there to the non-oxidizing pressure leach autoclave 24. The solution from the liquid-solid separation step 22 is passed to the iron removal stage 26. It is to be understood that the iron removal stage may be extended to include an iron and arsenic removal step or an iron, arsenic and antimony removal stage where appropriate. In certain instances it may be necessary to add additional iron, either in solution or dissolved in situ, to effect precipitation of the arsenic and/or antimony, as is well known to those skilled in the art.

The solution is passed to an autoclave in the iron removal stage 26, which contains up to 10 g/L iron and up to 10 g/L arsenic, and reacted with oxygen at a temperature of between 130 to 160° C., preferably 150° C., and pressure of between 450 to 1000 kPa for a retention time of between 1 to 3 hours to produce a solution containing less than 1 g/L iron and arsenic, and to precipitate the remaining iron as ferric arsenate (about 20 to 25% Fe), a jarosite (about 25 to 30% Fe) and/or hematite (about 50 to 60% Fe). The solution containing 5 to 20 g/L Cu, less than 1 g/L Fe and As, 10 to 40 g/L sulphuric acid and 40 to 50 g/L Ni is then fed to the non-oxidizing pressure leach autoclave 24. In the iron removal stage 26, when operated at about 150° C., hematite formation is favoured over jarosite formation at feed solution $H_2SO_4$:Fe mass ratios of about 2.5:1 or lower. At feed solution $H_2SO_4$:Fe mass ratios greater than 3:1, the formation of jarosite is favoured. At a feed solution $H_2SO_4$:Fe mass ratio of about 2:1, jarosite formation becomes more favourable with decreased temperature as shown in the test results given herebelow.

TABLE 1

| Test | Feed $H_2SO_4$:Fe mass ratio | Residue Fe Content % | Residue Type |
| --- | --- | --- | --- |
| 1 | 1.7 | 55.3 | Hematite |
| 2 | 2.0 | 51.1 | Hematite |
| 3 | 2.3 | 54.1 | Hematite |
| 4 | 3.1 | 39.9 | Mixed |
| 5 | 3.3 | 30.6 | Jarosite |
| 6 | 4.0 | 29.6 | Jarosite |
| 7 | 5.0 | 30.8 | Jarosite |

The pressure hydrolysis tests were carried out at 150° C., with a total pressure of 850 kPa, corresponding to an oxygen partial pressure of 375 kPa.

Table II below demonstrates the effect of temperature upon the type of residue obtained with a total pressure of 850 kPa.

TABLE II

| Test | Temperature °C. | Feed H$_2$SO$_4$:Fe mass ratio | Residue Fe Content % | Residue Type |
|---|---|---|---|---|
| 8 | 130 | 1.7 | 46.7 | Mixed |
| 9 | 150 | 1.7 | 55.3 | Hematite |
| 10 | 160 | 1.7 | 58.6 | Hematite |

At lower temperatures (130° C.), jarosite formation is favoured even at low acid:Fe mass ratios.

In the non-oxidizing pressure leach 24, the non-oxidizing atmosphere is maintained by sparging steam or steam containing nitrogen into an autoclave to maintain the solution temperature at above 120° C., preferably in the range of 140° to 160° C. The upgraded copper sulphide residue, containing CuS as digenite having a Cu:S mass ratio of 3.6:1, and the platinum group metals together with some impurities such as Se, Te and Sb, are passed on to other circuits, not shown, for further treatment for the recovery of cathode copper. The solution containing less than 2 g/L Fe and As, 5 to 10 g/L Cu, 30 to 40 g/L sulphuric acid and 50 to 60 g/L Ni is passed back to the second stage atmospheric leach 14.

In an alternative embodiment, it is to be noted that the pressure leach may be conducted under mildly oxidizing conditions, namely by sparging air or oxygen into the autoclave in a manner known to one skilled in the art. Typically, mildly oxidizing conditions would comprise 500 kPa air or 100 kPa oxygen partial pressure.

Figure 2A:
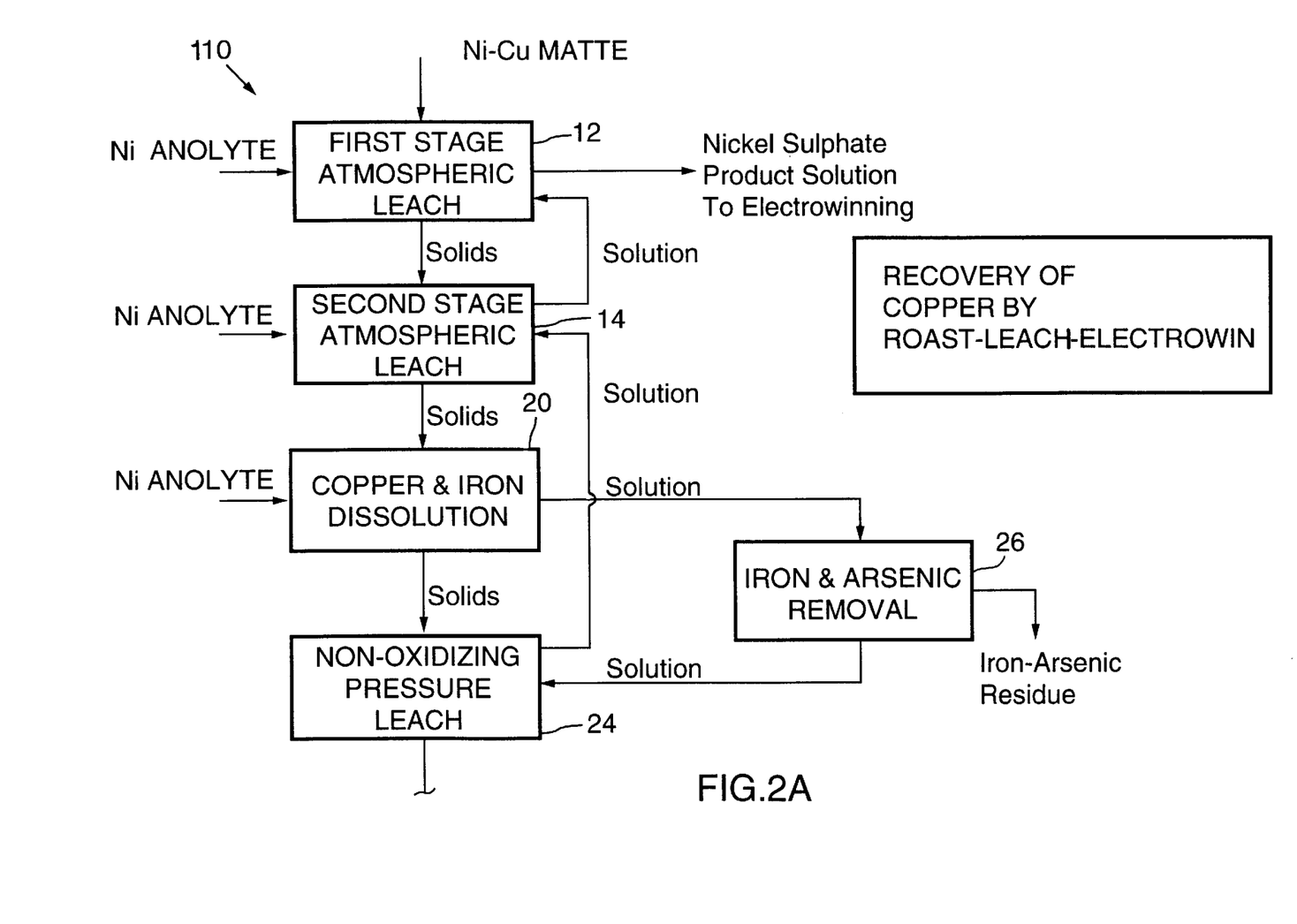
Figure 2B:
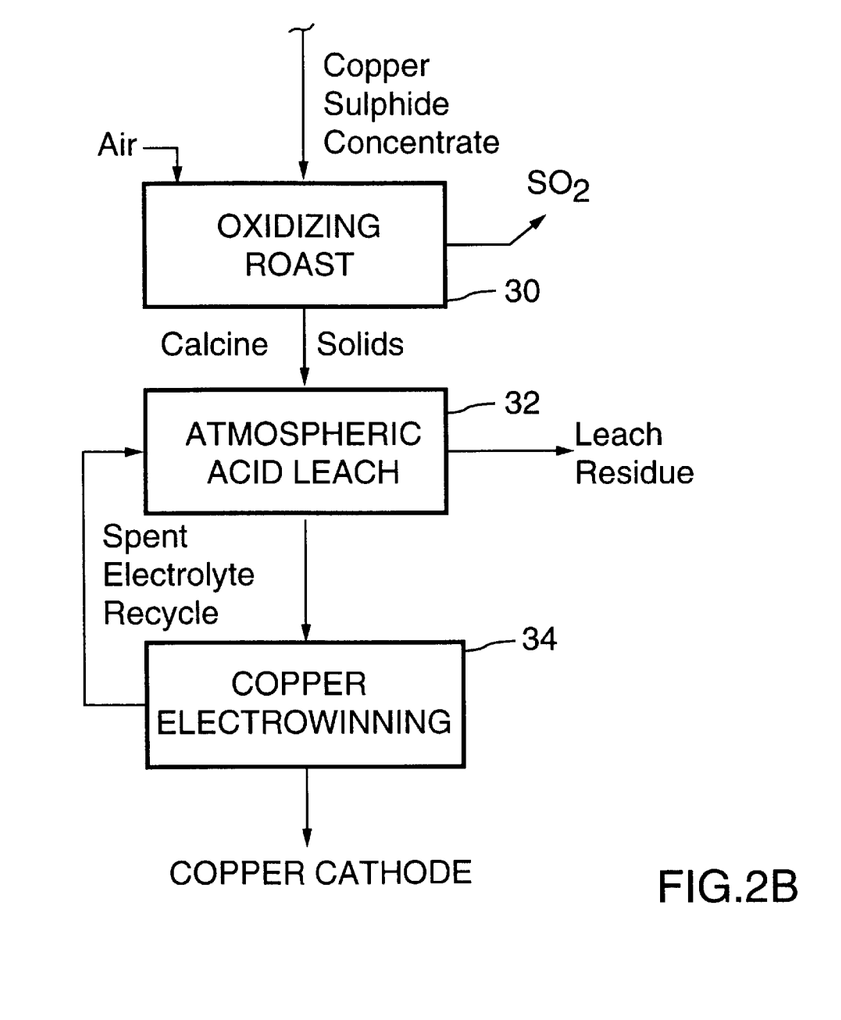

In FIG. 2, there is depicted a flowsheet in which the upgraded copper sulphide residue produced by the process of the present invention is treated by a roast-leach-electrowinning process to produce copper cathode. The copper sulphide concentrate is roasted in a stream of air at 700° C. in a fluid bed roaster 30 to oxidize the copper sulphide to form copper oxide and sulphur dioxide which is utilized for the production of sulphuric acid. The roaster calcine, which contains copper oxide and iron oxide, is leached in recycled spent electrolyte containing sulphuric acid to dissolve the copper oxide as copper sulphate in an atmospheric leach 32. After solution purification steps (not shown) to remove any dissolved iron and other impurities, cathode copper is recovered from the copper sulphate solution by electrowinning 34. The concentration of nickel and arsenic in the electrowinning circuit is controlled by bleeding a portion of spent electrolyte back to the matte atmospheric leach circuits.

Figure 3A:
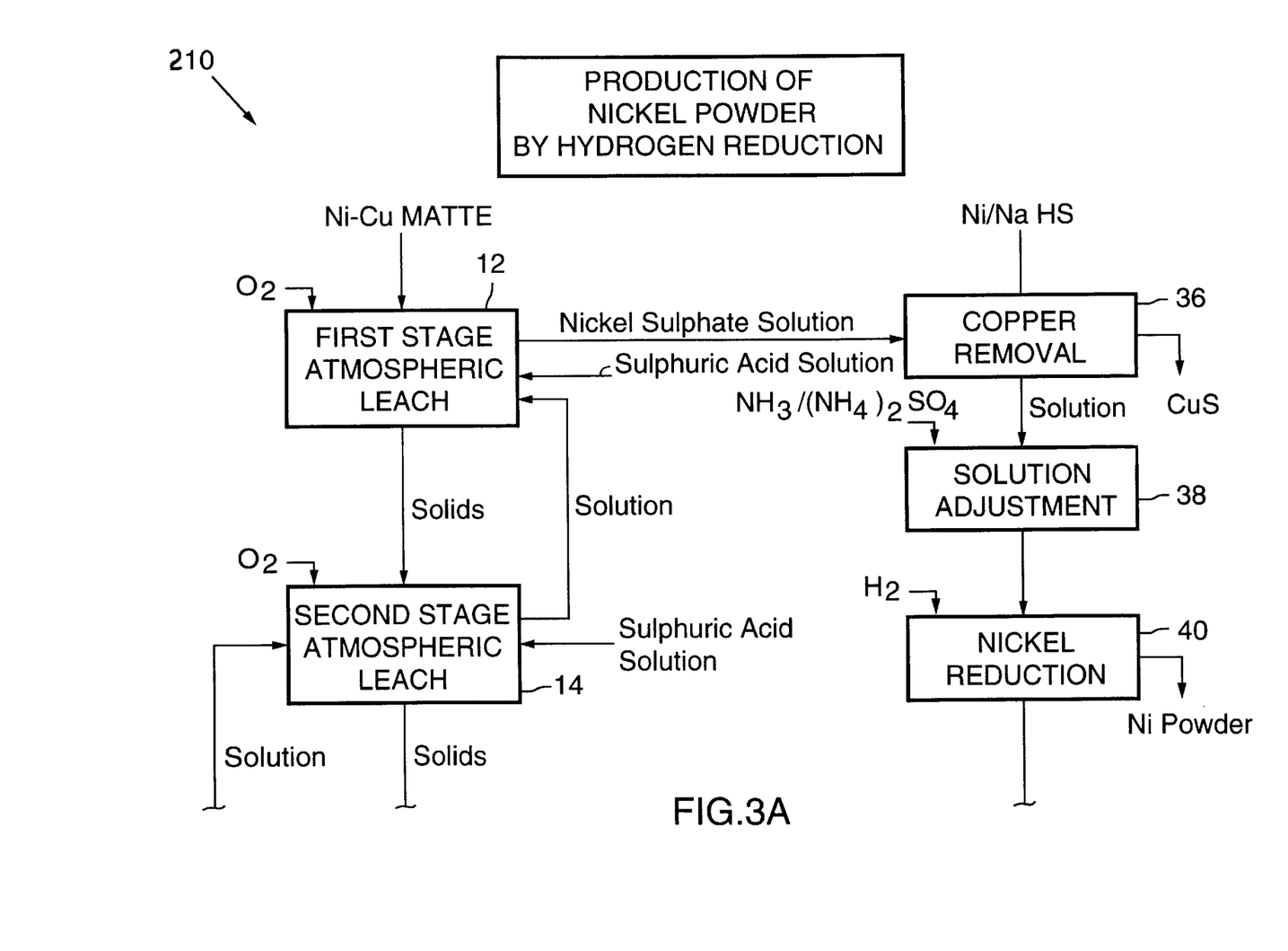
Figure 3B:
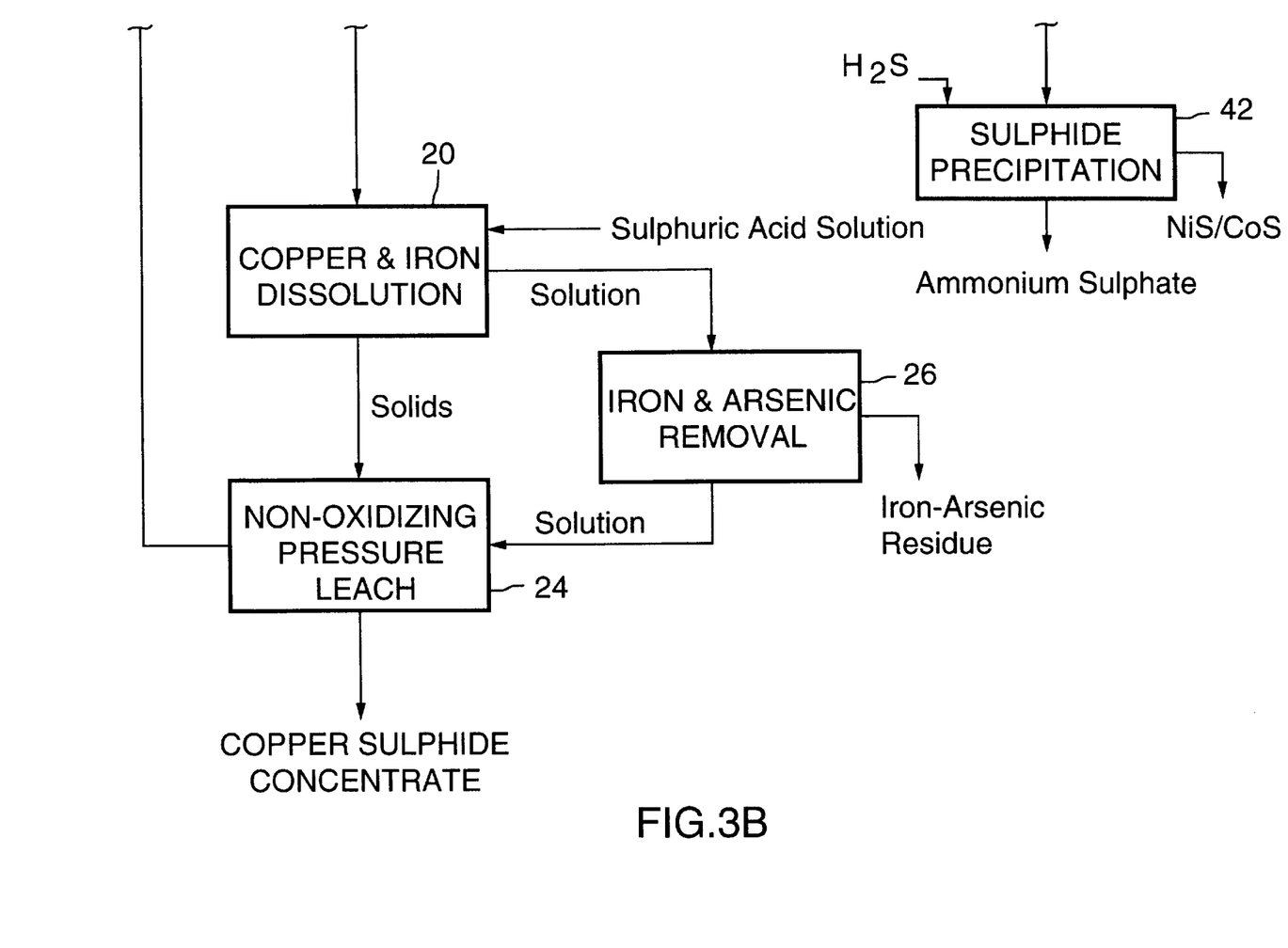

Having reference to FIG. 3, there is depicted a flowsheet in which the nickel sulphate solution produced by the first stage atmospheric leach 12 of the process of the present invention is treated by hydrogen reduction to produce metallic nickel powder. The solution is treated in an optional copper removal step 36, in which traces of copper are precipitated using nickel powder and sodium hydrosulphide. The copper sulphide precipitate is separated by filtration from the purified nickel sulphate solution. Ammonium sulphate and aqueous ammonia solution are added to the nickel sulphate solution in solution adjustment step 38 and the ammonia to nickel molar ratio adjusted to about 2:1, to form nickel diammine sulphate. The ammonium sulphate solution concentration is adjusted to the range 200 to 300 g/L. The nickel diammine sulphate solution is heated to 250° C. and reduced with hydrogen gas at a pressure of about 3.5 MPa in the nickel reduction step 40. The nickel powder production process is a batch process in which the powder particles are grown to the desired size, by reducing up to 60 consecutive charges of nickel diammine solution on to fine seed particles. The solution discharged from the reduction step 40, which typically contains about 1 g/L Ni and 1 g/L Co, and over 400 g/L ammonium sulphate, is treated with hydrogen sulphide to precipitate the nickel and cobalt as sulphides in the sulphide precipitation step 42 and recycled to the nickel-copper matte leach step 12. The barren solution is evaporated to crystallize ammonium sulphate, which is utilized as a fertilizer. In this flowsheet, the nickel anolyte normally used as leachant in the process of the invention is replaced by an aqueous solution of sulphuric acid.

Figure 4A:
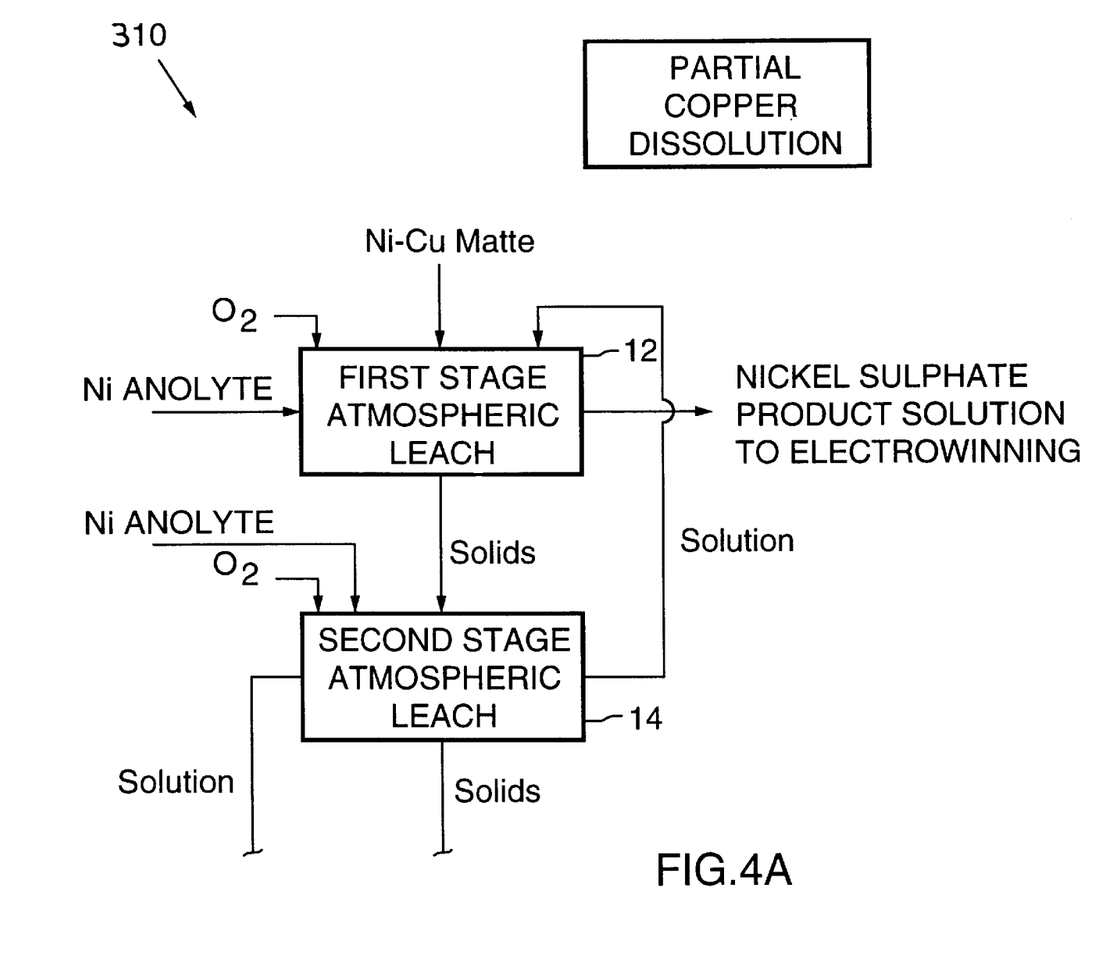
Figure 4B:
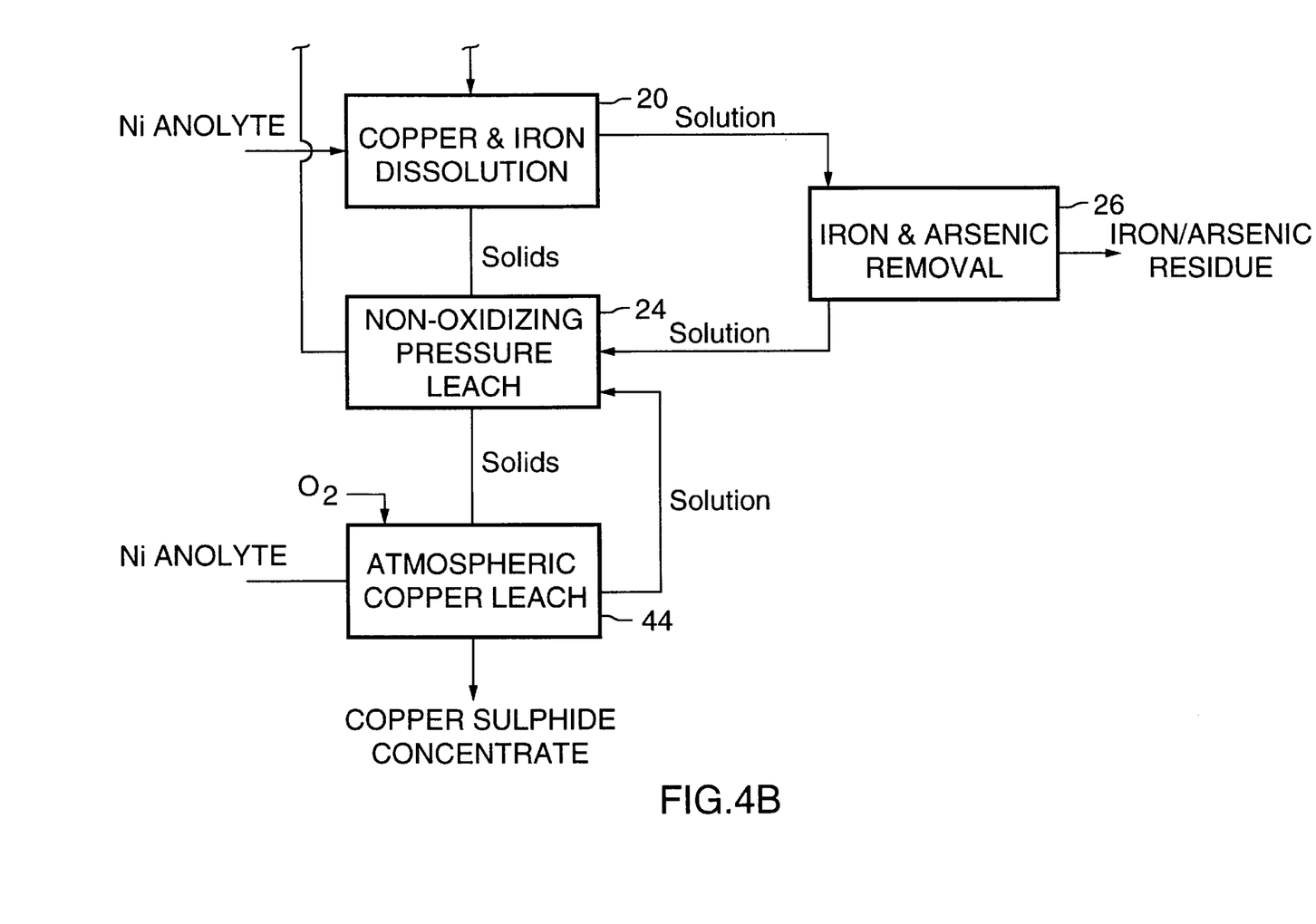

Having reference to FIG. 4, there is illustrated a flowsheet wherein the upgraded copper sulphide residue produced by the non-oxidizing pressure leach of the process of the present invention is leached under oxidizing conditions in an atmospheric leach 24 step 44 at 80° C., to redissolve up to 50% of the copper content, as copper sulphate, and to provide soluble copper by recycle to the non-oxidizing pressure leach step 24, when copper deficient mattes (i.e. with a Cu:S mass ratio of less than 3:1) are to be processed.

The essentials of the invention comprise, in combination, the use of the copper dissolution step, the removal of the iron and arsenic prior to the non-oxidizing pressure leach, and the passage of the low iron and arsenic containing solution stream to the pressure leach.

The process of the invention will now be described having reference to the following non-limitative examples.

EXAMPLE 1

This example illustrates the prior art process disclosed in U.S. Pat. No. 5,344,479 applied to the treatment of a nickel-copper matte containing a high concentration of iron. A nickel-copper matte, containing by weight 48% Ni, 33.5% Cu, 12% S, and 3.0% Fe, was treated in two stages of oxidative atmospheric sulphuric acid leaching, according to the process disclosed in U.S. Pat. No. 5,344,479 to produce a leach residue analyzing 38.8% Cu, 12.7% Ni, 15% S and 7.5% Fe.

This residue was repulped in a sulphuric acid solution containing 51 g/L H$_2$SO$_4$, 48 g/L Ni, 4.9 g/L Cu and 120 g/L Na$_2$SO$_4$ at a solid:solution ratio of 100 g/L and the resulting slurry was batch leached at 150° C. under non-oxidizing conditions for four hours. The resulting solid residue contained 68% Cu, 18.2% S, 0.66% Ni and 4.3% Fe. X-ray diffraction analysis of the residue indicated that the iron phase was sodium jarosite, NaFe$_3$(SO$_4$)$_2$(OH)$_6$. The leach discharge solution contained 28 g/L H$_2$SO$_4$, 58 g/L Ni, 8.8 g/L Cu and 4.6 g/L Fe. Rate samples taken during the course of the pressure leach test showed that the iron content of the residue had increased from 1.0% at the start, to 4.6% at the end of the leach, confirming that the jarosite had been formed in the non-oxidizing pressure leach, and not in the prior atmospheric leach step. The maximum soluble iron level observed in the leach solution was 6.2 g/L.

A second pressure leach test was carried out to determine if sodium jarosite would precipitate from a leach solution containing a lower concentration of iron. A second stage atmospheric leach residue produced from the same nickel-copper matte, and analyzing 37% Cu, 13.9% Ni, 16.5% S, and 6.8% Fe, was pressure leached at 150° C. for four hours under non-oxidizing conditions, at a solids:solution ratio of 60 g/L. In this test, the highest iron concentration observed in solution was 4.3 g/L Fe, and after four hours leaching this had dropped only to 4.0 g/L Fe. The leach residue analyzed 73% Cu, 23% S, 0.73% Ni and 0.71% Fe.

This example indicated that the precipitation of sodium jarosite in the non-oxidizing pressure leach can be minimized or prevented by ensuring that the concentration of iron in solution remains below 4 g/L throughout the non-oxidizing pressure leach.

EXAMPLE 2

This example illustrates the removal of most of the iron content from a solution produced by repulping second stage atmospheric leach residue in sulphuric acid solution, and separating the acidic solution from the acid-insoluble residue.

A sample of second stage atmospheric leach residue, produced from the nickel-copper matte described in Example 1, was repulped in sulphuric acid solution containing 50 g/L $H_2SO_4$, 51 g/L Ni and 120 g/L $Na_2SO_4$, at a solids:solution ratio of 80 g/L. The resulting slurry was filtered, to provide a solution analyzing 4.1 g/L Fe, 17 g/L Cu, 20 g/L $H_2SO_4$, and 55 g/L Ni.

This solution was then treated to precipitate most of the iron, in a pressure hydrolysis step at elevated temperature and oxygen pressure, using a small quantity of a high-iron nickel-copper-cobalt alloy as an in situ neutralizing agent. The finely ground alloy, analyzing 39% Fe, 31% Ni, 13% Cu, 3.5% Co, and 7% S, was added to the product solution from the copper and iron redissolution step, and the slurry was heated in a batch autoclave at 150° C., under a 500 kPa oxygen partial pressure, for five hours. The iron concentration in the solution was reduced to less than 1 g/L after three hours, and to less than 0.5 g/L after five hours. The resulting solution analyzed 21 g/L Cu, 14 g/L $H_2SO_4$ and 0.3 g/L Fe, which is very suitable as a feed solution to the non-oxidizing pressure leach. This solution was used to pressure leach the residue from the prior copper and iron redissolution step. The highest iron concentration observed in this non-oxidizing pressure leach test was 1.2 g/L Fe, and there was no indication that any sodium jarosite was precipitated.

EXAMPLE 3

Figure 1A:
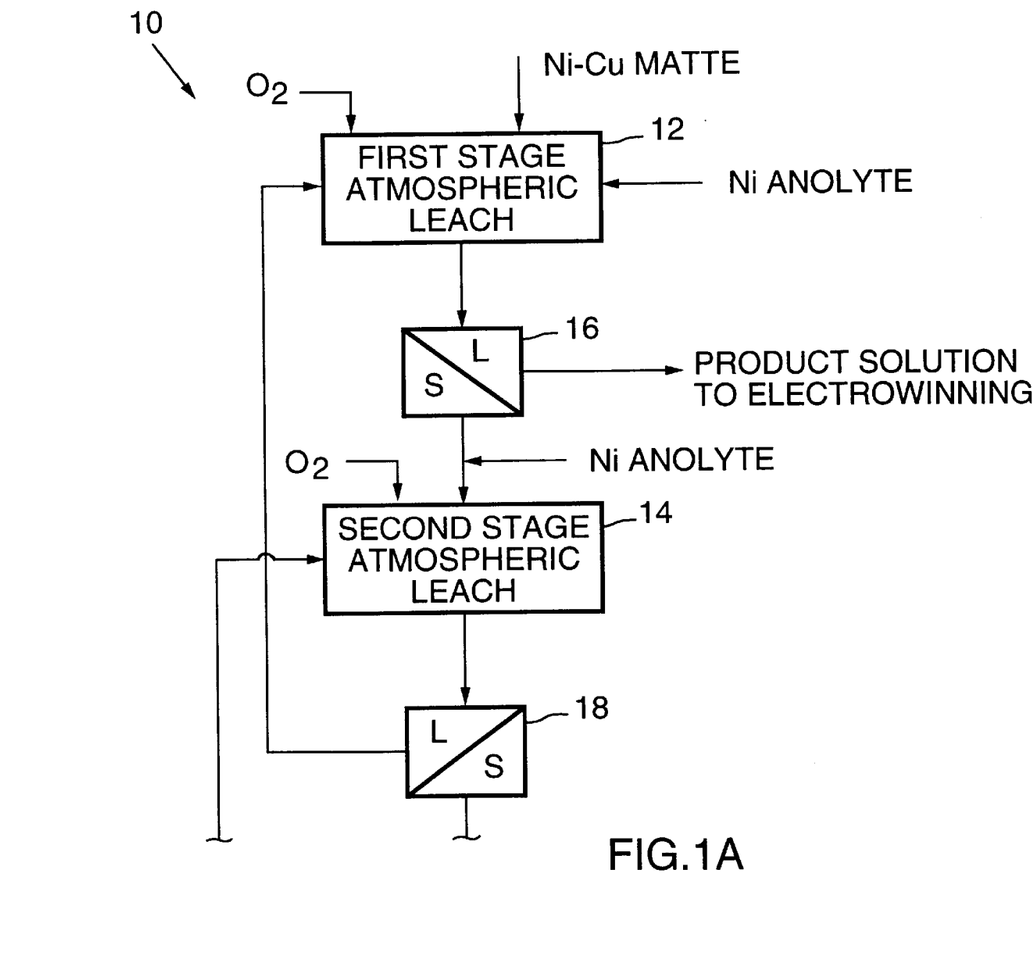
Figure 1B:
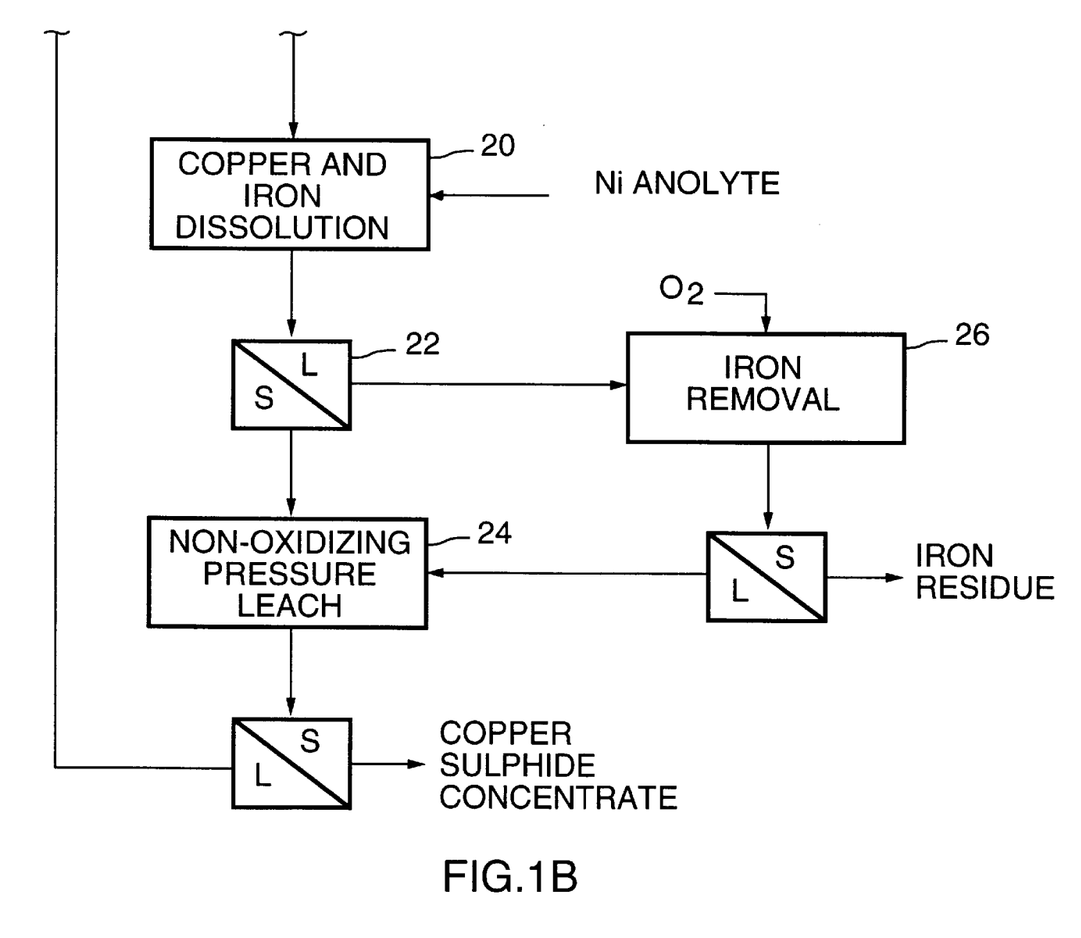

This example illustrates the performance of the process flowsheet of the present invention in a miniplant circuit which was operated continuously for seven days. The circuit included the two atmospheric leach steps 12, 14, the copper and iron redissolution step 20, the iron removal step 26, and the non-oxidizing pressure leach step 24 as shown in FIGS. 1A, 1B.

A finely ground nickel-copper matte analyzing 48% Ni, 34.5% Cu, 11.7% S, and 2.9% Fe, was treated in the two stages of atmospheric leaching, to yield a second stage residue typically analyzing 48% Cu, 8.5% Ni, 15% S and 5.5% Fe. This residue was repulped in an acid solution containing 45 g/L $H_2SO_4$, 48 g/L Ni and 0.5 g/L Cu, to yield a product solution typically containing 24 g/L $H_2SO_4$, 50 g/L Ni, 17 g/L Cu and 3 g/L Fe. The residue typically contained 55% Cu, 14% Ni and 2% Fe.

The solution produced in the copper and iron redissolution circuit was treated at 150° C. with a 500 kPa oxygen overpressure, with a retention time of five hours. The high iron alloy as described in Example 2, was used as an in-situ neutralizing agent. The product solution contained 20 g/L Cu, 59 g/L Ni, 17 g/L $H_2SO_4$ and 0.65 g/L Fe, while the hematite residue analyzed 55% Fe, 0.8% Ni and 0.8% Cu.

The product residue from the copper and iron redissolution step was repulped in the product solution from the iron removal step, and the resulting slurry was treated in the non-oxidizing pressure leach at 150° C., with a retention time of 5 hours. The copper concentrate product typically analyzed 74% Cu, 20% S, 0.3% Ni and 0.4% Fe, while the solution contained only 1.5 g/L Fe, together with 12 g/L Cu, 70 g/L Ni and 25 g/l, $H_2SO_4$.

EXAMPLE 4

This example illustrates the treatment of higher arsenic and iron containing material in the prior art process disclosed in U.S. Pat. No. 5,344,479 and in the improved process flowsheet of the present invention.

A high arsenic and iron containing leach residue analyzing 11% Ni, 31% Cu, 10% Fe, 11% As and 12% S was produced from atmospheric leaching of nickel-copper matte, according to the process disclosed in U.S. Pat. No. 5,344,479. A sample of this atmospheric leach residue was repulped in a sulphuric acid solution containing 50 g/L $H_2SO_4$, 51 g/L Ni, 5.1 g/L Cu and 120 g/L $Na_2SO_4$ at a solids:solution ratio of 80 g/L and the resulting slurry was batch pressure leached at 150° C. under non-oxidizing conditions for four hours. The resulting solids residue analyzed 46% Cu, 14% S, 4.4% Ni, 5.7% Fe and 12% As. The leach discharge solution contained 35 g/L $H_2SO_4$, 51 g/L Ni, 3.0 g/L Cu, 4.8 g/L Fe and 2.3 g/L As.

A second sample of the same high arsenic and iron containing atmospheric leach residue was subjected to treatment in the improved process flowsheet of the present invention. The atmospheric leach residue was repulped in sulphuric acid solution containing 50 g/L $H_2SO_4$, 50 g/L Ni and 120 g/L $Na_2SO_4$, at a solids:solution ratio of 80 g/L, with the aim of redissolving copper, arsenic and iron. The resulting slurry was filtered, to separate solids analyzing 21% Ni, 44% Cu, 2.0% Fe, 0.4% As and 30% S from solution analyzing 7.0 g/L Fe, 8.3 g/L As, 11 g/L Cu, and 15 g/L $H_2SO_4$.

This solution was partially neutralized to 11 g/L $H_2SO_4$ using NaOH and then treated to precipitate most of the arsenic and iron, in a batch pressure hydrolysis step at elevated temperature and oxygen pressure (150° C. and 500 kPa oxygen partial pressure) for five hours. The arsenic and iron concentrations in solution were reduced to less than 1 g/L each after two hours, and the final discharge solution after five hours analyzed 8.6 g/L Cu, 16 g/L $H_2SO_4$, 1.0 g/L Fe and 0.6 g/L As, which is suitable as a feed solution to the non-oxidizing pressure leach.

The low arsenic and iron containing solution from the pressure hydrolysis step was combined with the residue from the prior copper, arsenic and iron redissolution step. The repulped slurry was batch leached at 150° C. under non-oxidizing conditions for five hours. The resulting solids residue analyzed 73% Cu, 19% S, 0.7% Ni, 1.6% Fe and 0.5% As. The highest arsenic and iron concentrations observed in this non-oxidizing pressure leach test were 1.1 g/L Fe and 0.6 g/L As, and there was no indication that any arsenic or iron reprecipitation had occurred.

It will be understood, of course, that modifications can be made in the embodiments of the invention illustrated and described herein without departing from the scope and purview of the invention as defined by the appended claims.

We claim:

1. A process for separating and recovering nickel and copper values from a nickel-copper sulphide matte which may contain iron, iron and arsenic, or iron, arsenic and antimony to produce a nickel sulphate solution and a low-nickel, copper sulphide product essentially free of iron and arsenic, which comprises:

leaching finely divided nickel-copper matte in an aqueous acidic solution under oxidizing conditions at atmospheric pressure with an effective amount of acid and at a minimum temperature of about 80° C. to selectively leach nickel from said matte to produce a nickel sulphate solution having a final pH in the range of about 3.0 to 6.5 and to produce a copper-rich iron-containing sulphide residue containing a controlled amount of readily acid-soluble copper;

separating the copper-rich iron-containing sulphide residue from the nickel sulphate solution, and leaching said residue in an acid containing solution in a copper and iron dissolution step to provide a copper and iron containing sulphate solution and a copper-rich sulphide residue, separating the copper and iron containing sulphate solution from the residue, passing the copper and iron containing sulphate solution to an iron removal stage wherein said solution is oxidized at a temperature of up to about 160° C. under pressure in an oxidizing atmosphere to produce an iron-rich residue and a substantially iron-free solution, separating the iron-rich residue and said iron-free solution; and leaching the copper-rich sulphide residue from the copper and iron dissolution stage together with the iron-free solution produced from the iron-removal stage in an acidic solution containing an effective amount of acid-soluble copper under non-oxidizing pressure conditions at a temperature of at least about 130° C. to produce a nickel sulphate solution and a low-nickel, copper sulphide product essentially free of iron and arsenic.

2. The process as set forth in claim 1 wherein said iron removal stage may comprise an iron and arsenic removal stage or an iron, arsenic and antimony removal stage.

3. The process as set forth in claim 2 which may further comprise adding iron either as dissolved iron or as acid soluble iron to said iron and arsenic removal stage or said iron, arsenic and antimony removal stage.

4. The process as set forth in claim 3, comprising leaching the copper-rich residue from the copper and iron dissolution stage in an acidic solution selected from the group consisting of sulphuric acid, sulphuric acid solution containing nickel sulphate, sulphuric acid solution containing copper sulphate, and sulphuric acid solution containing nickel sulphate and copper sulphate to provide a copper and iron containing solution.

5. The process as set forth in claim 4, wherein said step comprising leaching finely divided nickel-copper matte in an aqueous acidic solution under oxidizing conditions at atmospheric pressure with a deficiency of acid and at a minimum temperature of about 80° C. to selectively leach nickel from said matte to produce a nickel sulphate solution having a final pH in the range of about 3.0 to 6.5 and to produce a copper-rich sulphide residue containing readily acid-soluble copper is conducted sequentially as a first stage atmospheric leach and a second stage atmospheric leach.

6. The process as set forth in claim 4, reacting the copper and iron containing solution in the iron removal stage at a temperature of about 150° C. and a solution $H_2SO_4$:Fe mass ratio of up to about 2.5:1 for the precipitation of hematite containing about 50 to 60% Fe.

7. The process as set forth in claim 4, reacting the copper and iron containing solution in the iron removal stage at a temperature of about 150° C. and a solution $H_2SO_4$: Fe mass ratio of above about 3:1 for the precipitation of jarosite containing about 25 to 30% Fe.

8. The process as set forth in claim 5 further comprising recycling the solution from the second stage atmospheric leach to the first stage atmospheric leach.

9. The process as set forth in claim 6 further comprising recycling the solution from the non-oxidizing pressure leach to said second stage atmospheric leach.

10. A process for separating and recovering nickel and copper values from a nickel-copper sulphide matte which may contain iron, iron and arsenic, or iron, arsenic and antimony to produce a nickel sulphate solution and a low-nickel, copper sulphide product essentially free of iron and arsenic, which comprises:

leaching finely divided nickel-copper matte in an aqueous acidic solution under oxidizing conditions at atmospheric pressure with an effective amount of acid and at a minimum temperature of about 80° C. to selectively leach nickel from said matte to produce a nickel sulphate solution having a final pH in the range of about 3.0 to 6.5 and to produce a copper-rich iron-containing sulphide residue containing a controlled amount of readily acid-soluble copper;

separating the copper-rich iron-containing sulphide residue from the nickel sulphate solution, and leaching said residue in an acid containing solution in a copper and iron dissolution step to provide a copper and iron containing sulphate solution and a copper-rich sulphide residue, separating the copper and iron containing sulphate solution from the residue, passing the copper and iron containing sulphate solution to an iron removal stage wherein said solution is oxidized at a temperature of up to about 160° C. under pressure in an oxidizing atmosphere to produce an iron-rich residue and a substantially iron-free solution, separating the iron-rich residue and said iron-free solution; and leaching the copper-rich sulphide residue from the copper and iron dissolution stage together with the iron-free solution produced from the iron-removal stage in an acidic solution containing an effective amount of acid-soluble copper under mildly oxidizing pressure conditions at a temperature of at least about 130° C. to produce a nickel sulphate solution and a low-nickel, copper sulphide product essentially free of iron and arsenic.

11. The process as set forth in claim 10 wherein said step comprising leaching finely divided nickel-copper matte in aqueous sulphuric acid solution under oxidizing conditions at atmospheric pressure with a deficiency of acid and at a minimum temperature of about 80° C. to selectively leach nickel from said matte to produce a nickel sulphate solution having a final pH in the range of about 3.0 to 6.5 and to produce a copper-rich sulphide residue containing readily acid-soluble copper is conducted sequentially as a first stage atmospheric leach and a second stage atmospheric leach.

12. The process as set forth in claim 11 further comprising recycling the solution from the second stage leach to the first stage atmospheric leach.

13. The process as set forth in claim 11 further comprising recycling the solution from the mildly oxidizing pressure leach to said second stage atmospheric leach.

* * * * *